A. KLEINSHROT.
TIRE PROTECTOR.
APPLICATION FILED DEC. 7, 1918.
1,347,513.
Patented July 27, 1920.
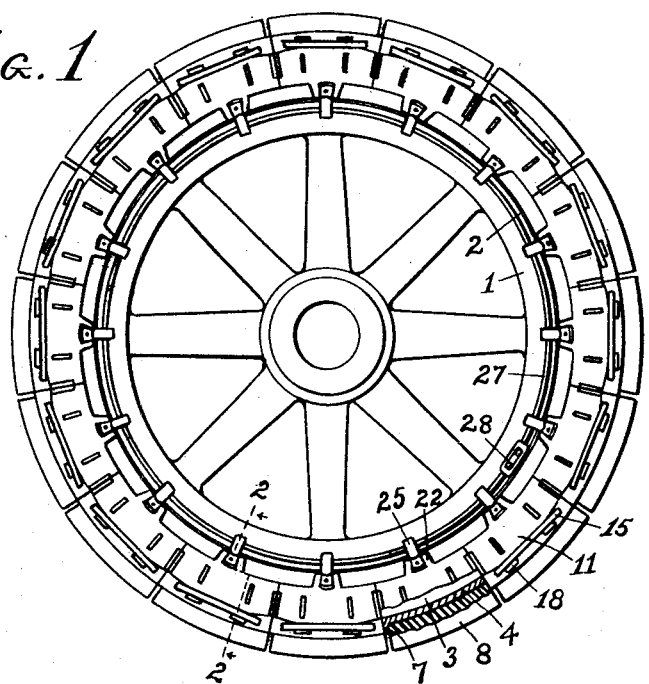
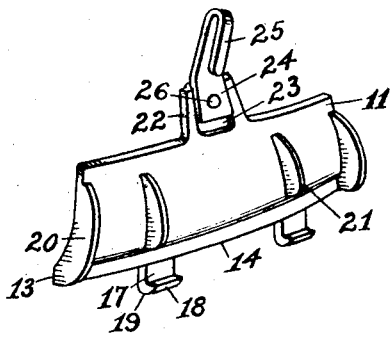
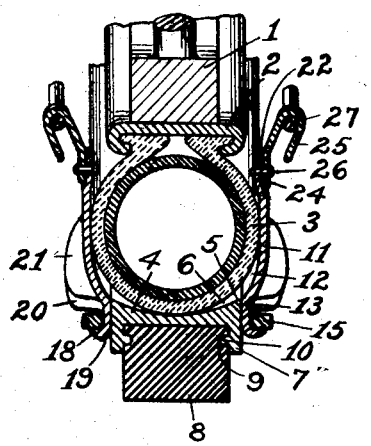
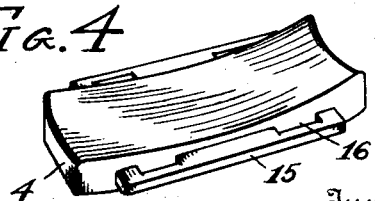
Inventor
A. Kleinshrot
his Attorney

UNITED STATES PATENT OFFICE.

ALBERT KLEINSHROT, OF CLEVELAND, OHIO.

TIRE-PROTECTOR.

1,347,513.     Specification of Letters Patent.     Patented July 27, 1920.

Application filed December 7, 1918. Serial No. 265,756.

*To all whom it may concern:*

Be it known that I, ALBERT KLEINSHROT, a citizen of the United States, residing at Cleveland, in the county of Cuyahoga and State of Ohio, have invented certain new and useful Improvements in Tire-Protectors, of which the following is a specification.

This invention relates to tire protectors, and has for its principal object to provide an armor for protecting pneumatic tires, which is constructed of a plurality of similar sections simple in design and inexpensive to manufacture that may be easily replaced when worn or broken.

Another object of the invention is to provide protectors, in which the sections are constructed of separate connected parts in order that the parts may be readily renewed and thereby save the sections at little expense.

With the above and other objects in view as will be readily understood, the invention will be hereinafter fully described in connection with the accompanying drawings, which are simply intended to illustrate the same, and the novel features thereof will be distinctly pointed out in the appended claims.

In the drawings like characters of reference are used to designate corresponding parts.

Figure 1 is a side elevation of a wheel with an armor made according to my invention applied to the tire thereof, Fig. 2 is a cross-section view, on an enlarged scale, on line 2—2 of Fig. 1, Fig. 3 is a perspective view of a side-plate, and Fig. 4 is a similar view of a tread-member.

Referring to the drawings, 1 represents the felly of a wheel, and 2 the channeled rim carried thereby for holding the pneumatic tire 3, all of ordinary construction. My invention consists in providing an armor for protecting said pneumatic tire, which is made up of a plurality of simple and inexpensive sections. Each section comprises a face or tread-member 4, which is curved in its longitudinal direction to conform to the circumference of the tire, while in cross-section its inner side 5 is formed with a greater radius than the tire so as to leave spaces 6 for receiving the same when it becomes slightly flattened due to the load. At the front end and the sides of the tread member 4 is a flange 7 for receiving a block of solid rubber 8. Said block of rubber is provided with longitudinal grooves 9 for sliding over side strips 10 extending inwardly from the sides of the tread-member to securely hold the block of rubber in place. As there is no flange at the rear end of the tread-member 4, the block of rubber may be conveniently slid therein, and longitudinal movement thereof will be prevented by the front end flange and the front end flange of the next adjacent tread-member.

Arranged at the sides of the tread-member 4 are plates 11, which extend over the sides of the pneumatic tire 3 and conform substantially to its circumference, but leave spaces 12 for the flattening of the tire. The side-plates 11 have straight outer portions 13 for fitting against the sides of the tread-member 4, and their edges 14 engage outwardly extending flanges 15 thereof, which are provided with slotted openings 16 for receiving lugs 17 formed integrally with said straight portions of the plates, and having outwardly bent nibs 18 for engaging said flanges to connect the plates to the tread-member. The lugs coöperate with the openings 16 of the flanges 15 in such a manner as to form hinge joints, and the inner edges of the lugs are rounded at 19 to permit outward movement of the plates, due to pressure of the tire when flattening under a load. For strengthening the side-plates 11, they are provided with outwardly turned end flanges 20, and intermediate ribs 21. The end flanges 20 of the side-plates of each section of the armor abut the flanges of the next adjacent section, and this serves to prevent longitudinal movement of the sections with relation to each other. Said end flanges and ribs of the side-plates serve to aid in traction.

Extending from the inner edges of the side-plates 11 are central tongues 22, which are provided with tapering grooves 23, for receiving correspondingly tapering shanks 24 of outwardly inclined hooks 25. The shanks of the hooks are fixed in said grooves by single rivets 26, and should the hooks become worn or broken, they may be very easily replaced. Said sections of the armor are attached to the tire by the hooks 25 slidably engaging a pair of suitable rings 27, which have their free ends connected by turn-buckles 28 for the purpose of adjusting the tension on the sections.

When the load exerts the usual pressure upon the lower portion of the penumatic tire 3, it tends to flatten and thereby forces the side-plates 11 outwardly and they swing at the hinge joints 17. At the same time, the side-plates move upwardly, whereby the hooks 25 slide radially in an inclined direction upon the rings 27.

From the description and drawings, it is readily seen that the side-plates 11 are conveniently attached to the tread-members 4, and the hooks 25 to the side-plates, so that said side-plates or hooks may be easily replaced in case of wear or breakage.

Having fully described my invention, what I claim is:

1. In a tire protector, the combination of a tread with hooks fixed to the sides thereof, rings, and said hooks being inclined outwardly and slidably engaging said rings, substantially as described.

2. In a tire protector, the combination of tread members, the tread members having flanges at the sides thereof, the flanges having openings therethrough, side plates, the side plates having lugs for entering the openings of said flanges to form hinge joints, the lugs having nibs for engaging said flanges to retain the lugs in operative position, and means for supporting the side plates to permit radial movement thereof, substantially as described.

3. In a tire protector, the combination of tread members, side plates hingedly connected to the tread members, the side plates having central tongues, the tongues being provided with tapering grooves, hooks, the hooks having tapering shanks for fitting into said grooves, means for fixing the shanks of the hooks to said tongues, and means for the attachment of said hooks to permit radial movement thereof, substantially as described.

4. In a tire protector, the combination of tread members, side plates hingedly connected to the tread members, flanges at the ends of the side plates for slidably engaging the end flanges of the next adjacent tread members, and means for the attachment of the side plates to permit radial movement thereof, substantially as described.

5. In a tire protector, the combination of tread members, side plates hingedly connected to the tread members, means for supporting the side plates to permit radial movement thereof, the tread members having flanges at their front ends and sides, the side flanges having inwardly extending side strips, blocks of rubber, and the blocks of rubber having grooves for sliding over said side strips, substantially as described.

In testimony whereof I affix my signature.

ALBERT KLEINSHROT.